(12) United States Patent
Borgstrom et al.

(10) Patent No.: US 11,227,586 B2
(45) Date of Patent: Jan. 18, 2022

(54) SYSTEMS AND METHODS FOR IMPROVING MODEL-BASED SPEECH ENHANCEMENT WITH NEURAL NETWORKS

(71) Applicant: Massachusetts Institute of Technology, Cambridge, MA (US)

(72) Inventors: Bengt J. Borgstrom, Lexington, MA (US); Michael S. Brandstein, Acton, MA (US); Robert B. Dunn, Arlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 187 days.

(21) Appl. No.: 16/567,525

(22) Filed: Sep. 11, 2019

(65) Prior Publication Data
US 2021/0074282 A1    Mar. 11, 2021

(51) Int. Cl.
| | |
|---|---|
| *G10L 15/20* | (2006.01) |
| *G10L 15/22* | (2006.01) |
| *G10L 15/16* | (2006.01) |
| *G10L 25/18* | (2013.01) |
| *G10L 21/0232* | (2013.01) |
| *G10L 15/06* | (2013.01) |
| *G06N 3/08* | (2006.01) |
| *G10L 25/84* | (2013.01) |
| *G10L 21/0208* | (2013.01) |

(52) U.S. Cl.
CPC .......... *G10L 15/20* (2013.01); *G06N 3/08* (2013.01); *G10L 15/063* (2013.01); *G10L 15/16* (2013.01); *G10L 15/22* (2013.01); *G10L 21/0232* (2013.01); *G10L 25/18* (2013.01); *G10L 25/84* (2013.01); *G10L 2021/02082* (2013.01)

(58) Field of Classification Search
CPC ..... G10L 15/00; G10L 21/0208; G10L 25/00; G06N 3/08
See application file for complete search history.

(56) References Cited

U.S. PATENT DOCUMENTS

| | | | |
|---|---|---|---|
| 7,092,881 B1 * | 8/2006 | Aguilar | G10L 19/093 704/207 |
| 2016/0284346 A1 * | 9/2016 | Visser | G10L 25/30 |
| 2018/0366138 A1 * | 12/2018 | Ramprashad | G10L 21/0208 |

OTHER PUBLICATIONS

[No Author Listed] Free-Sound Background Noise Subset, https://freesound.org (2 pages).

(Continued)

*Primary Examiner* — Mohammad K Islam
(74) *Attorney, Agent, or Firm* — Barnes & Thornburg LLP

(57) ABSTRACT

Systems and methods improving the performance of statistical model-based single-channel speech enhancement systems using a deep neural network (DNN) are disclosed. Embodiments include a DNN-trained system to predict speech presence in the input signal, and this information can be used to create frameworks for tracking noise and conducting a priori signal to-noise ratio estimation. Example frameworks provide increased flexibility for various aspects of system design, such as gain estimation. Examples include training a DNN to detect speech in the presence of both noise and reverberation, enabling joint suppression of additive noise and reverberation. Example frameworks provide significant improvements in objective speech quality metrics relative to baseline systems.

18 Claims, 10 Drawing Sheets

(56) References Cited

OTHER PUBLICATIONS

Bertin et al., "A french corpus for distant-microphone speech processing in real homes," Interspeech, 2016 (6 pages).
Borgstrom et al., "The linear prediction inverse modulation transfer function (lp-imtf) filter for spectral enhancement, with applications to speaker recognition," ICASSP, IEEE, pp. 4065-4068, 2012 (4 pages).
Cohen, I, "Noise spectrum estimation in adverse environments: Improved minima controlled recursive averaging," EEE Transactions on Speech and Audio Processing, vol. 11, No. 5, pp. 466-475, 2003 (10 pages).
Cohen, I, "Optimal speech enhancement under signal presence uncertainty using log-spectral amplitude estimator," EEE Signal Processing Letters, vol. 9, No. 4, pp. 113-116, 2002 (4 pages).
Cohen, I, "Relaxed statistical model for speech enhancement and a priori SNR estimation," IEEE Transactions on Speech and Audio Processing, vol. 13, No. 5, pp. 870-881, 2005 (12 pages).
Dat et al., "Generalized gamma modeling of speech and its online estimation for speech enhancement," ICASSP, IEEE, vol. 4, pp. IV-181-IV-184, 2005 (4 pages).
Ephraim et al., "Speech enhancement using a minimum mean-square error log-spectral amplitude estimator," IEEE Transactions on Acoustics, Speech, and Signal Processing, vol. 33, No. 2, pp. 443-445, 1985 (3 pages).
Ephraim et al., "Speech enhancement using a minimum-mean square error short-time spectral amplitude estimator," IEEE Transactions on Acoustics, Speech, and Signal Processing, vol. 32, No. 6, pp. 1109-1121, 1984 (13 pages).
Erkelens et al., "Minimum mean-square error estimation of discrete fourier co-efficients with generalized gamma priors," IEEE Transactions on Audio, Speech, and Language Processing, vol. 15, No. 6, pp. 1741-1752, 2007 (12 pages).
Garofolo et al., "The DARPA TIMIT Acoustic-phonetic continuous speech corpus," 1986 (speech not readily available to submit as non-publihsed literature; please see https://catalog.ldc.upenn.edu/LDC93S1 for additional information).
Gerkmann et al., "Unbiased MMSE-based noise power estimation with low complexity and low tracking delay," IEEE Transactions on Audio, Speech, and Language Processing, vol. 20, No. 4, pp. 1383-1393, 2012 (11 pages).
Gray Jr. et al., "Cosh measure for speech processing," The Journal of the Acoustical Society of America, vol. 58, No. S1, pp. S97, 1975 (2 pages).

Han et al., "Learning spectral mapping for speech dereverberation and denoising," IEEE/ACM Transactions on Audio, Speech, and Language Processing, vol. 23, No. 6, pp. 982-992, 2015 (11 pages).
Loizou, P.C., "Speech enhancement based on perceptually motivated bayesian estimators of the magnitude spectrum," IEEE Transactions on Speech and Audio Processing, vol. 13, No. 5, pp. 857-869, 2005 (13 pages).
Lu et al., "Ensemble modeling of denoising autoencoder for speech spectrum restoration," ISCA, 2014 (5 pages).
Martin, R, "Noise power spectral density estimation based on optimal smoothing and minimum statistics," IEEE Transactions on Speech and Audio Processing, vol. 9, No. 5, pp. 504-512, Jul. 2001 (9 pages).
McAulay et al., "Speech enhancement using a soft-decision noise suppression filter," IEEE Transactions on Acoustics, Speech, and Signal Processing, vol. 28, No. 2, pp. 137-145, 1980 (9 pages).
Pascual et al., "SEGAN: Speech enhancement generative adversarial network," arXiv preprint arXiv:1703.09452, 2017 (5 pages).
Plapous et al., "Improved signal-to-noise ratio estimation for speech enhancement," IEEE Transactions on Audio, Speech, and Language Processing, vol. 14, No. 6, pp. 2098-2108, 2006 (11 pages).
Plourde et al., "Auditory-based spectral amplitude estimators for speech enhancement," IEEE Transactions on Audio, Speech, and Language Processing, vol. 16, No. 8, pp. 1614-1623, 2008 (10 pages).
Rix et al., "Perceptual evaluation of speech quality (pesq)—a new method for speech quality assessment of telephone networks and codecs," ICASSP, IEEE, vol. 2, pp. 749-752, 2001 (4 pages).
Ruder, S, "An overview of multi-task learning in deep neural networks," arXiv preprint arXiv:1706.05098, 2017 (14 pages).
Snyder et al., "MUSAN: A Music, Speech, and Noise Corpus," arXiv:1510.08484v1, 2015 (4 pages).
Wang et al., "On training targets for supervised speech separation," IEEE/ACM Transactions on Audio, Speech, and Language Processing, vol. 22, No. 12, pp. 1849-1858, 2014 (10 pages).
Weninger et al., "Speech enhancement with lstm recurrent neural networks and its application to noise-robust asr," International Conference on Latent Variable Analysis and Signal Separation, Springer, pp. 91-99, 2015 (10 pages).
Wu et al., "A reverberation-time-aware approach to speech dereverberation based on deep neural networks," IEEE/ACM Transactions on Audio, Speech, and Language Processing, vol. 25, No. 1, pp. 102-111, 2017 (10 pages).
Xu et al., "A regression approach to speech enhancement based on deep neural networks," IEEE/ACM Transactions on Audio, Speech, and Language Processsing, vol. 23, No. 1, pp. 7-19, 2015 (13 pages).

\* cited by examiner

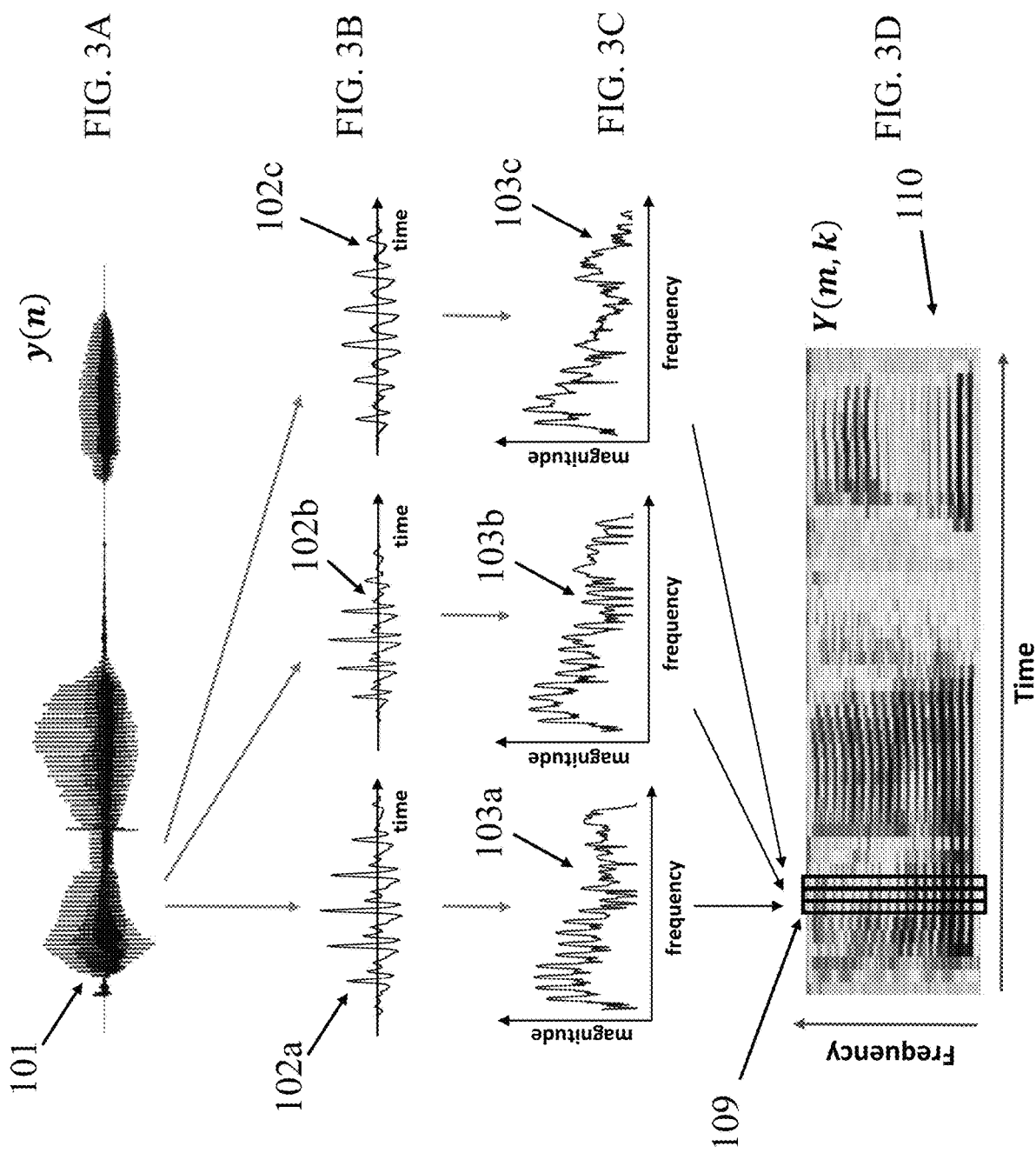

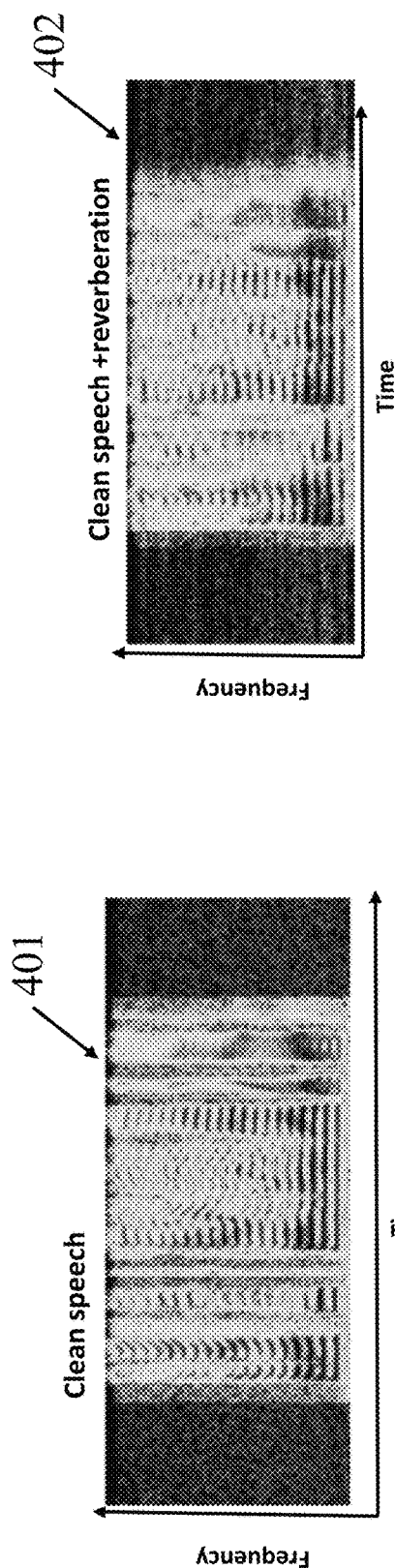
FIG. 4B
FIG. 4A
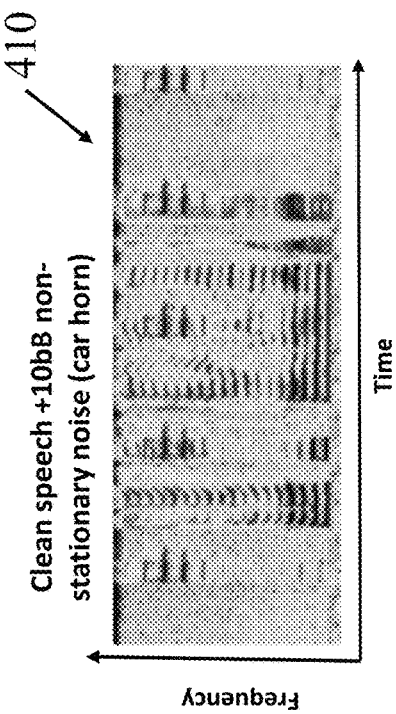
FIG. 4D
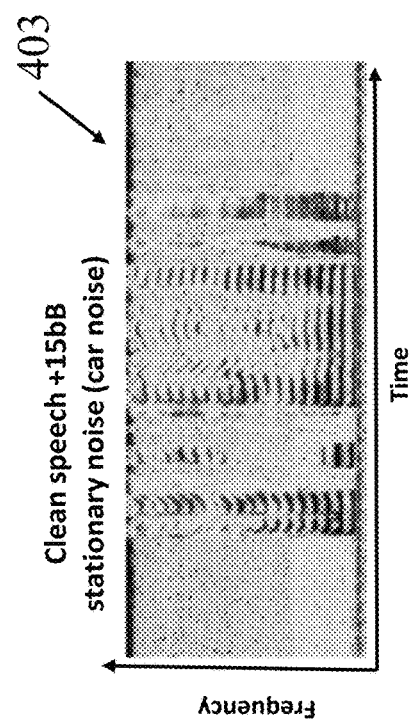
FIG. 4C

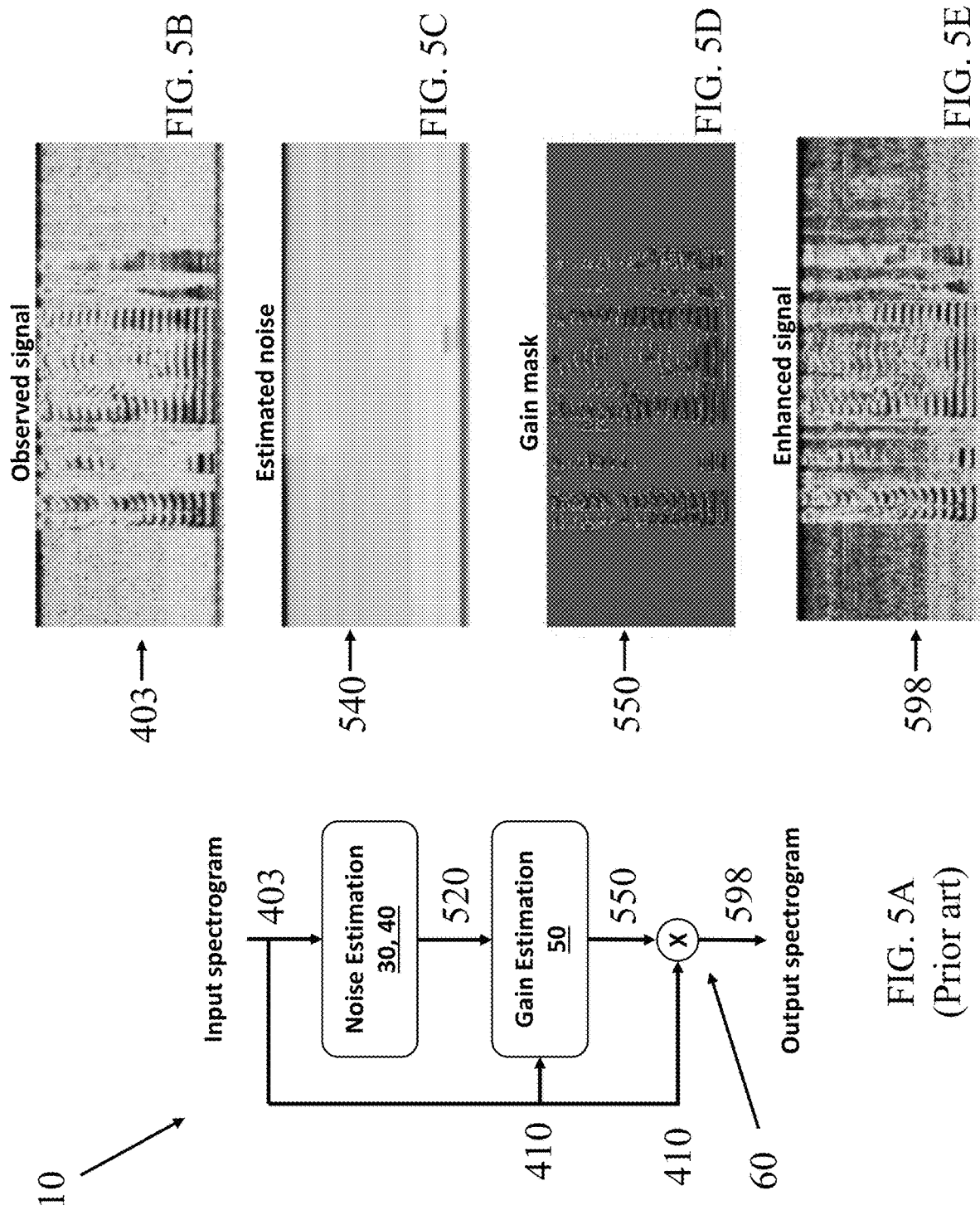

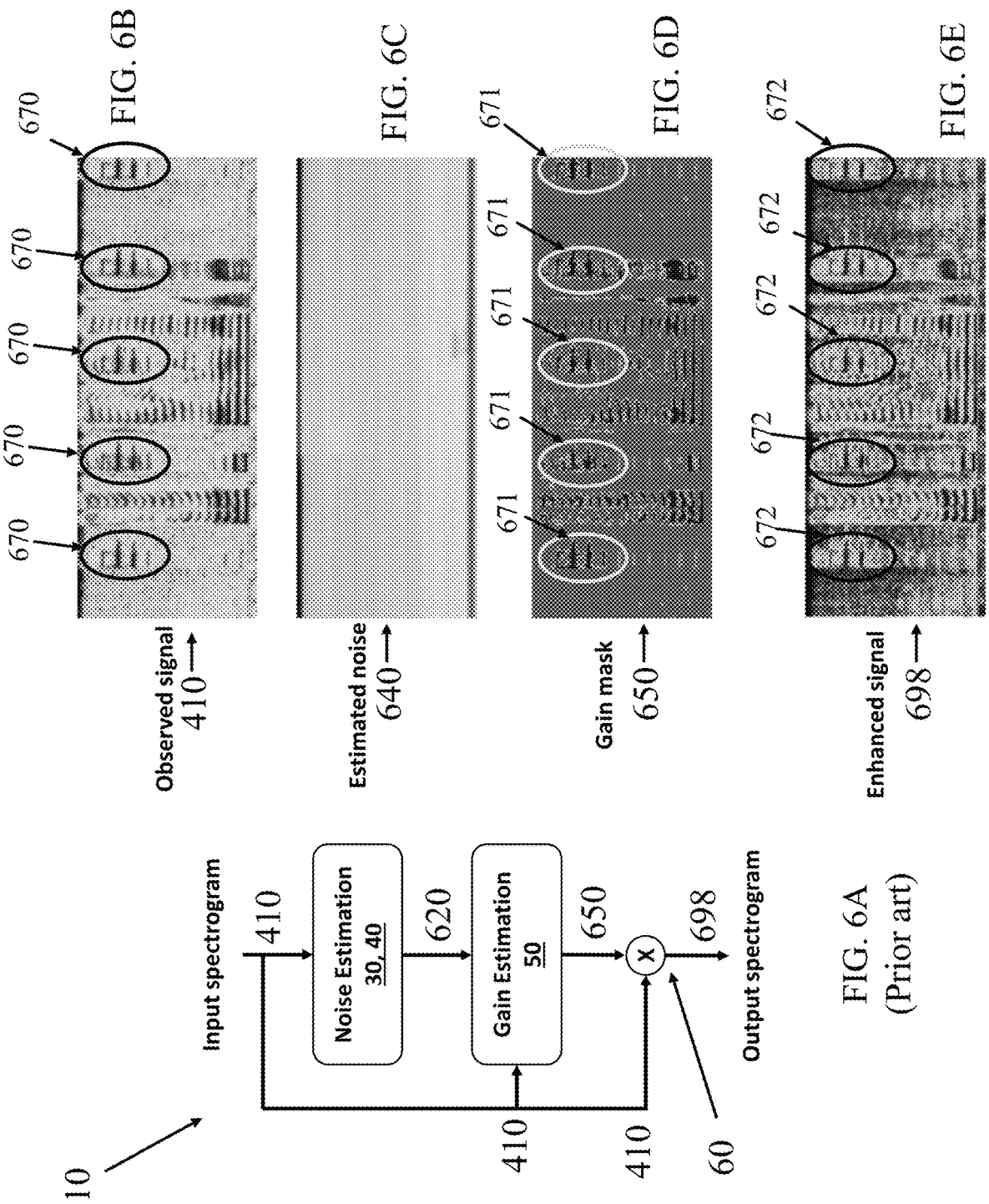

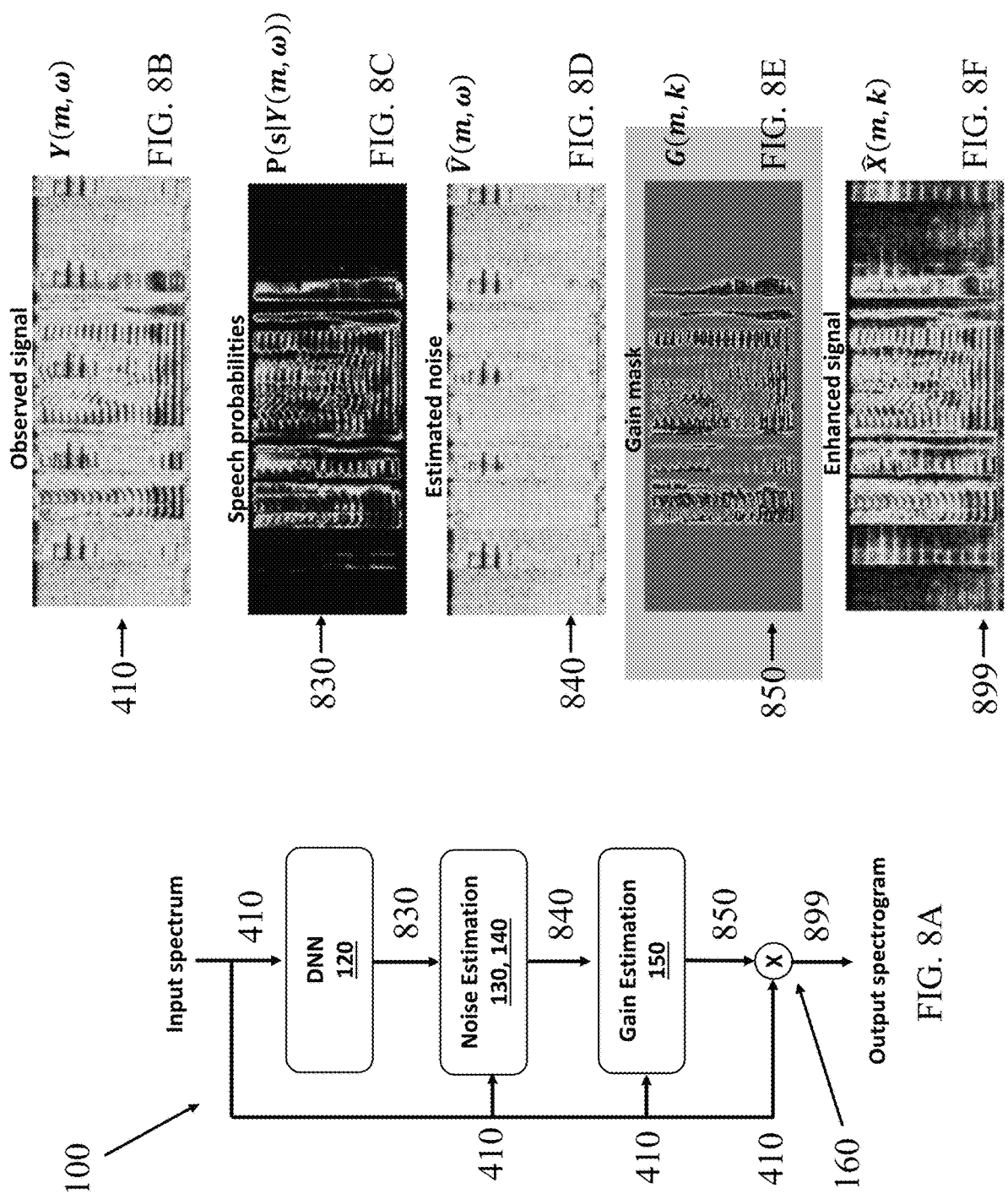

SYSTEMS AND METHODS FOR IMPROVING MODEL-BASED SPEECH ENHANCEMENT WITH NEURAL NETWORKS

FIELD

The following disclosures relates to using deep neural networks (DNNs) for detecting the presence of speech in an audio signal as well as suppressing noise and distortion in the audio signal based on the detection of speech.

BACKGROUND

Speech signals acquired in the real world are rarely of pristine quality. Because of ambient environmental conditions and the location of the microphone relative to the desired talker, the signal obtained is frequently corrupted by additive noise and reverberation, and speech enhancement can be used to minimize the effects of these acoustic degradations. Statistical model-based approaches, which interpret speech and noise as random variables and rely on statistical inference to estimate the underlying clean speech signal, have been explored for several decades. Although significant performance improvements have been achieved, tracking non-stationary noise and reverberation remains a difficult task.

Statistical model-based speech enhancement has been explored for several decades and significant performance improvements have been achieved during that time. These approaches interpret speech and noise as random variables and rely on statistical inference to estimate the underlying clean speech signal. Conventional model-based systems contain noise estimation, which aims to track the underlying noise signal in the short-time spectral domain. The noise estimate is then leveraged to estimate local time- and frequency-specific a posteriori signal-to-noise ratios (SNRs), and more global a priori SNRs. Finally, a multiplicative gain is estimated based on SNR information by minimizing some probabilistic cost and applied in the short-time spectral domain to suppress the effect of additive noise in the input signal.

Statistical model-based systems have experienced significant progress in recent years. Gain estimation has been improved to minimize perceptually relevant cost functions and allow heavy-tailed distributions for speech and/or noise processes. Additionally, noise tracking has evolved to handle non-stationary noise components more effectively. Finally, methods have been developed to infer a priori SNRs more accurately. However, estimation of the underlying noise signal and a priori SNRs remain the most difficult tasks in conventional enhancement systems, particularly for inputs signals with highly non-stationary additive noise components or reverberation.

In order to overcome the limitations of statistical model-based approaches, there has been recent interest in using DNNs for single channel speech enhancement due to their powerful modeling capacities. Initial studies trained denoising autoencoders to predict clean underlying spectra based on a noisy spectrogram, and similar approaches were proposed for reverberation suppression. Other studies trained DNNs to directly estimate multiplicative gains for enhancement. In each of these cases, DNNs were used for regression, which can lead to unacceptable speech distortion in the synthesized signal.

Accordingly, there is a need for systems and methods that effectively detect the presence of speech in an audio signal and/or can suppress noise and/or distortion in an audio signal based on the detection of speech.

SUMMARY

Certain aspects of the present disclosure relate to a framework for improving statistical model-based speech enhancement by training a deep neural network(s) (DNN) to predict speech presence in an input signal. The output posterior probabilities can be leveraged for tracking non-stationary noise components. The DNN(s) can be trained to detect speech in the presence of both noise and reverberation, leading to joint suppression of the two. The framework provides increased flexibility for system design, providing better control over the tradeoff between noise suppression and speech quality. Aspects of the present disclosure can provide significant improvements in objective speech quality measures, relative to baseline systems.

One exemplary embodiment of a computer-implemented system for recognizing and processing speech includes an input processor, a deep neural network, and an output processor. The input processor is configured to receive an input waveform and extract spectral features from the input waveform to form an initial spectrum. The deep neural network is trained to detect speech (e.g., human speech, synthesized speech, or playback speech) in the presence of at least one of noise or distortion, and is configured to output probabilities indicating the presence of speech in the extracted spectral features. The output processor is configured to modify the initial spectrum based on the probabilities indicating the presence of speech in each extracted spectral feature and output an enhanced waveform.

In some instances, the input can be configured to extract short-time spectral features from a time-varying initial spectrum. Additionally, or alternatively, the probabilities indicating the presence of speech in the spectral features can include a mask of frame and frequency-band-specific posterior probabilities.

The input processor can be configured to extract spectral features from the input waveform in the time and frequency domain to form the initial spectrum. The deep neural network can be configured to process the extracted spectral features to identify frame-specific and frequency band-specific speech presence in the initial spectrum, and the output processor can be configured to modify the initial spectrum on a per-frame and per-frequency band basis.

The deep neural network can be configured to predict voice activity (e.g., the probability of the presence of speech) on a per-frame and per-frequency-band basis of an input audio spectrum. The deep neural network can be trained using speech conversations created using speech data containing noise and/or distortion, and, in at least some instances, the speech data can be created using a combination of clean speech data and silence data. A gain can further be used to simulate a recording distance. The deep neural network can be trained to detect speech in the presence of noise. The speech conversations used in at least some such instances can be created by mixing the speech data with a noise signal created with at least one of a background noise data, a music data, or a non-stationary noise data. In some embodiments, the deep neural network can be trained to detect speech in the presence of both noise and distortion, and the deep neural network can be trained using human speech conversations created using speech data modified by room impulses responses. The distortion can include reverberation. In at least some such embodiments, each speech conversation can be created using the noise signal mixed with a reverberant speech signal to match a target signal-to-noise ratio. Further, the reverberant speech signal can be created by applying a room impulse response to the speech data to match a target reverberation time. In at least some such instances, binary marks can be used as output targets during training of the deep neural network. Further, the output mask can only be active in some such instances if the clean speech is dominate with respect to the noise signal, and the reverberant speech is dominate with respect to the clean speech.

The deep neural network can include one or more feed-forward layers. In some such embodiments, the deep neural network can include a bidirectional recurrent neural network input layer, a feedforward second layer, and at least one fully-connected third layer.

In some embodiments, the system can include a filter configured to apply a passband to the input signal. The passband can have a frequency range that corresponds to human speech. In at least some such instances, the filter can be configured to apply cepstral mean subtraction on at least one cepstral coefficient of the input signal.

The present system can further include a noise estimator. The noise estimator can be configured to receive the speech detection probabilities from the deep neural network and the input waveform and output a noise variance estimate on a per-frame and per-band basis. The output processor can be configured to modify the based on the noise variance.

The noise estimator can be configured to perform noise estimation recursively in time. Alternatively, or additionally, the noise estimator can be configured to process the initial spectrum as noise during inactive speech as determined by the output from the deep neural network and output the noise variance estimate of the inactive speech. The noise estimator can be further configured to output an attenuated version of a previous noise estimate during active speech. In at least some embodiments, the noise estimator can be configured to combine the noise estimates for inactive speech and active speech together in a soft-decision manner using the probabilities of speech from the output of the deep neural network.

The present system can also include a signal-to-noise ratio estimator. Such an estimator can be configured to receive the initial spectrum and the noise variance estimate, and calculate an a posteriori signal-to-noise ratio (SNR) of the initial spectrum and the noise variance estimate. In at least some such embodiments, the signal-to-noise ratio estimator can be configured to receive the speech detection probabilities from the deep neural network and estimate an a priori signal-to-noise ratio (SNR) of an underlying clean speech signal of the initial spectrum based on the speech detection probabilities. In some embodiments, one or both of the a posteriori SNRs and the a priori SNRs can be calculated on a per-frame and per-frequency band basis.

The present system can also include a gain estimator. The gain estimator can be configured to receive the initial spectrum and the noise variance estimate and calculate a gain mask for removing the estimated noise from the initial spectrum. The output processor can be configured to modify the initial spectrum based on the gain mask. In some embodiments that include a gain estimator, the noise estimator can be configured to calculate SNRs on a per-frame and per-frequency band basis, and the gain estimator can be configured to receive the initial spectrum, the noise variance estimate, and the SNRs. The gain estimator can be further configured to calculate a gain mask for each frame-specific and band-specific component in the initial spectrum based on a respective SNR such that a strength of each gain mask can correspond to the value of the corresponding SNR. Further, the output processor can be configured to modify the initial spectrum based on the gain masks.

A person skilled in the art will appreciate that various techniques for processing speech that similarly track with the systems described above or are otherwise supported by the disclosures provided herein are also possible.

One exemplary embodiment of a method for training a neural network for detecting the presence of speech includes constructing a multi-layer deep neural network that is configured to process extracted spectral features from an initial spectrum on a per-frame and per-frequency band basis to identify frame-specific and frequency band-specific spectral features that correspond to human speech, and training the deep neural network using human speech conversations created using speech data containing at least one of noise or distortion. At least some of the human speech conversations containing noise were created by mixing the speech data with a noise signal created with at least one of a background noise data, a music data, or a non-stationary noise data. Further, at least some of the human speech conversations containing distortion were created by modifying the speech data using room impulses responses. Still further, at least some of the speech data was created using a combination of clean speech data and silence data with a gain to simulate a recording distance.

In at least some training embodiments, each speech conversation can be created using the noise signal mixed with a reverberant speech signal to match a target signal-to-noise ratio. Further, the reverberant speech signal can be created by applying a room impulse response to the speech data to match a target reverberation time. In some embodiments, the method can further include training the deep neural network using binary marks as output targets, and the output mask can only be active in some such instances if the clean speech is dominate with respect to the noise signal, and the reverberant speech is dominate with respect to the clean speech.

Certain embodiments of the present system provide significant levels of noise suppression while maintaining high speech quality, which can reduce the fatigue experienced by human listeners and may ultimately improve speech intelligibility. Embodiments of the present disclosure improve the performance of automated speech systems, such as speaker and language recognition, when used as a pre-processing step. Finally, the embodiments can be used to improve the quality of speech within communication networks.

BRIEF DESCRIPTION OF DRAWINGS

This disclosure will be more fully understood from the following detailed description taken in conjunction with the accompanying drawings, in which:

FIG. 3A-D are graphs showing the conversation of an input audio recording to a spectrogram on a per-frame and per-frequency band basis;

FIG. 4A is a spectrogram of a clean speech signal;

FIGS. 4B-4D are spectrograms of the clean speech signal of FIG. 4A with an additional noise or distortion provided for in each spectrogram;

FIG. 5A is the block diagram representation of FIG. 1A used in conjunction with the input spectrogram of FIG. 4C;

FIGS. 5B-5E illustrate spectrograms produced by the system of FIG. 5A and the processing of speech and stationary noise in conjunction with the same;

FIG. 6A is the block diagram representation of FIG. 5A, but used in conjunction with the input spectrogram of FIG. 4D;

FIGS. 6B-6E illustrate spectrograms and masks produced by the system of FIG. 6A and the processing of speech and non-stationary noise in conjunction with the same;

FIG. 8A is the block diagram representation of FIG. 1B used in conjunction with the input spectrogram of FIG. 4D;

FIGS. 8B-8F illustrate spectrograms and masks produced by the system of FIG. 8A and processing of speech and non-stationary noise in conjunction with the same;

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

Speech Presence Prediction

Figures 1A, 1B:
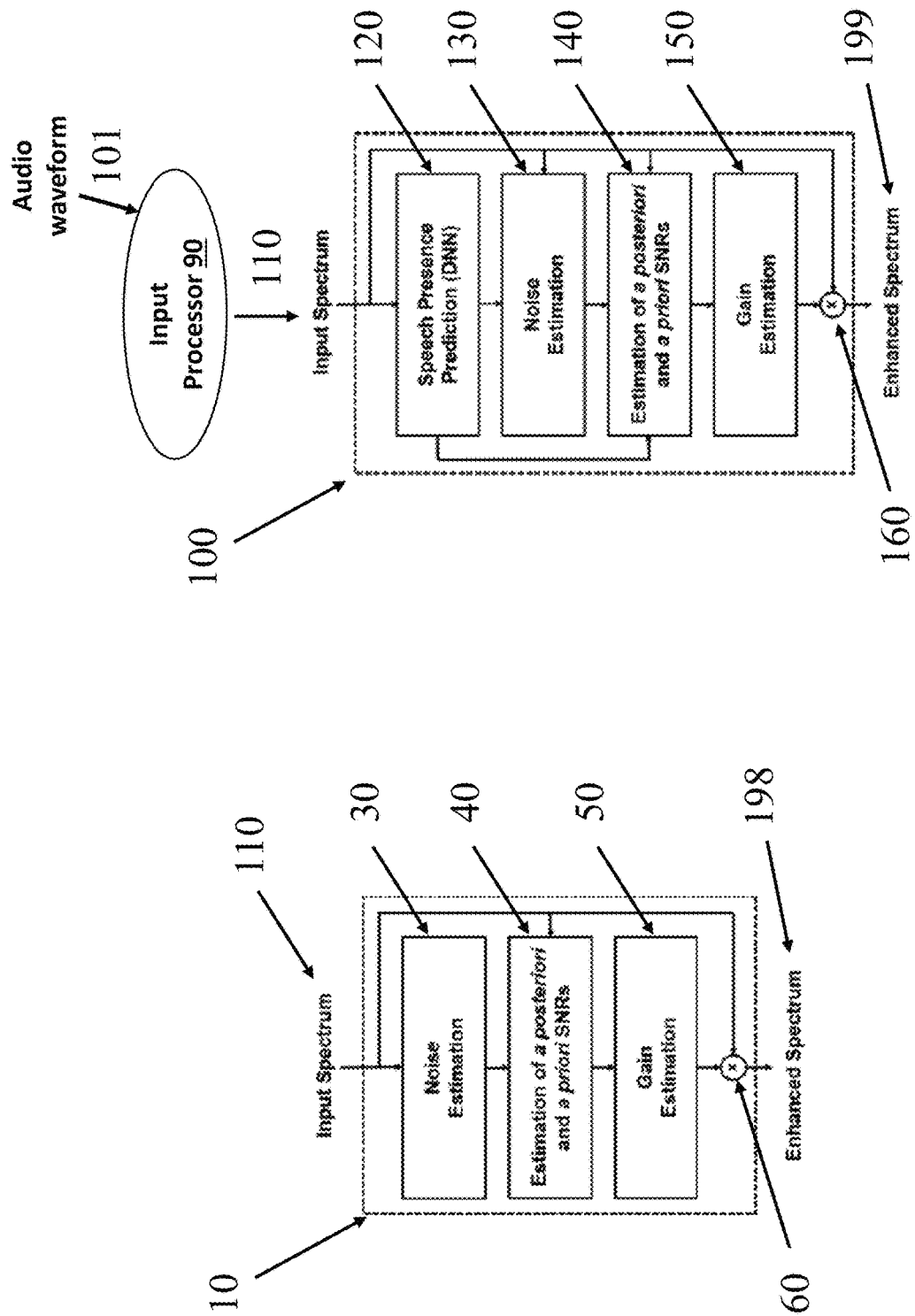
FIG. 1A is block diagram representation of one embodiment of a prior art speech enhancement system.
FIG. 1B is a block diagram representation of one exemplary embodiment of a speech enhancement system of the present disclosure.

FIG. 1A illustrates an overview of a prior art statistical model-based system 10 configured to receive a spectrum 110 as an input and provide an enhanced spectrum 198 as an output. As shown, the system 10 attempts to estimate and attenuate noise from the initial spectrum 110 to enhance the presence of speech in the output spectrum 198. The system 10 includes a noise estimator 30, a signal-to-noise ratio (SNR) estimator 40, a gain estimator 50, and an output processor 60. The noise estimator 30 uses a mode-based approach to analyze the initial spectrum 110 and output a noise estimation to the SNR estimator 40, which in turn can estimate the strength of the noise (e.g., the SNR) with respect to the initial spectrum 110. Based on the noise and SNR estimates, the gain estimator 50 can generate a gain mask for use by the output processor 60 in attenuating the initial spectrum 110 to generate the enhanced spectrum 198.

In operation, model-based systems like the system 10 typically only achieve satisfactory results for initial spectrums (e.g., the initial spectrum 110) containing stationary noise sources (e.g., not time-, frequency-, or amplitude-varying) and where the SNR is high. Model-based systems 10 are unlikely to produce satisfactory results (e.g., strong suppression of all noise in the enhanced spectrum 198 and a faithful reproduction of speech present in the initial spectrum 110) under a number of common conditions, such as non-stationary noises, low SNR, and/or reverberation. One reason for this is that model-based noise estimators 30 estimate the noise spectrogram from the observed spectrogram 110 and assume a slowly evolving noise signal. However, speech components usually evolve rapidly (e.g., faster than 3 Hz), and as a result, any components that are more stationary are assumed to be noise. These conventional noise estimation methods are not able to track and attenuate non-stationary noises, and their popularity is primarily due to their ability to remove slowly evolving or stationary noise (e.g., jet engine noise in an aircraft cabin).

In addition to prior art model-based systems, such as the system 10, other prior art systems utilize neural network-based approaches to single-channel speech enhancement, including designing neural networks to predict clean spectra or gain masks. These existing neural network-based systems try predicting clean spectrograms from degraded spectrograms. However, these approaches often result in unacceptable speech distortion because it can be very difficult or, arguably, impossible for a neural networks to be trained to synthesize natural human speech, which can be important for reconstructing a clean speech signal directly from a nosily signal.

Instead of using a neural network for regression and direct generation of an enhanced spectrum, aspects of the present disclosure include training a deep neural network (DNN) to detect the presence of speech in an initial spectrum 110, which represents a classification task and not a speech reconstruction task. When trained in this way, the DNN can output posterior probabilities of active speech for each time-frequency bin in the input spectrogram 110, and these outputs can then be used to improve conventional model-based enhancement during noise tracking and a priori SNR estimation. To the extent the present disclosure discloses or otherwise describes a DNN, it is appreciated multiple DNNs can likewise be used to achieve similar results.

FIG. 1B illustrates a speech enhancement system 100 in accordance with the present disclosure, the system 100 using a DNN 120 speech detection classifier. The system 100 is configured to receive, as an input, an initial spectrum 110 or spectrogram and output an enhanced spectrum 199, which represents the initial spectrum 110 with noise attenuation. The system 100 includes a noise estimator 130, an SNR estimator 140, a gain mask estimator 150, and an output processor 160, although each of these components is not necessary in every embodiment. By way of non-limiting example, in some instances, the system 100 may only include the noise estimator 130 and the SNR estimator 140. The system 100 can also include an input processor 90 configured to receive a raw audio signal or input waveform 101 (e.g., a time-domain signal) from, for example, a microphone, and generate the processed input spectrogram 110.

In operation, the input processor 90 can generate, from a time-domain signal 101, a series of frames of pseudo-stationary segments and then apply the Fourier transform of each segment to generate the local spectra for each frame. Together, the frames can comprise the initial spectrum 110 to be provided to the DNN 120. The DNN 120 can be trained to make binary classifications for each spectrogram bin, where a bin is an individual frequency band of a single frame. For example, the DNN 120 can be trained to output 0 if the bin does not contain active speech with 100% probability, and 1 if the bin contains active speech with 100% probability, and any value between 0 and 1 to represent probabilities between 0 and 100%. Accordingly, the output from the DNN 120 can be a mask of posterior probabilities (e.g., the statistical probability that a given frequency band of a given frame contains speech) of active speech presence. In one example, and as discussed in more detail below, the network architecture of the DNN 120 can include a feedforward structure, with, for instance, three hidden layers, each layer including 1024 nodes. The noise estimator 130 can estimate nose recursively such that the noise estimator 130 can generate a noise estimate using the output from the DNN 120, track the initial spectrum 110 when speech is not present, and smooth and/or attenuate a previous noise estimate when speech is present. The SNR estimator 140 can then calculate the a posteriori and a priori SNRs for the detected noise for use by the gain estimator 150, which can generate a multiplicative gain mask for use in modifying the initial spectrum 110 to suppress the detected noise without attenuating the detected speech. By applying the mask of posterior probabilities of active speech presence to the initial spectrum 110 before calculating noise estimates, the resulting gain mask more accurately suppresses noise and results in less residual noise in the enhanced spectrum 199. Additionally, because the application of the mask of posterior probabilities of active speech is considered to account for only and all speech present, the noise estimator 130 can detect non-stationary noises that the DNN 120 has identified as non-speech, which, accordingly, can be suppressed in the enhanced spectrum 199 by the resultant gain mask.

Figure 2:
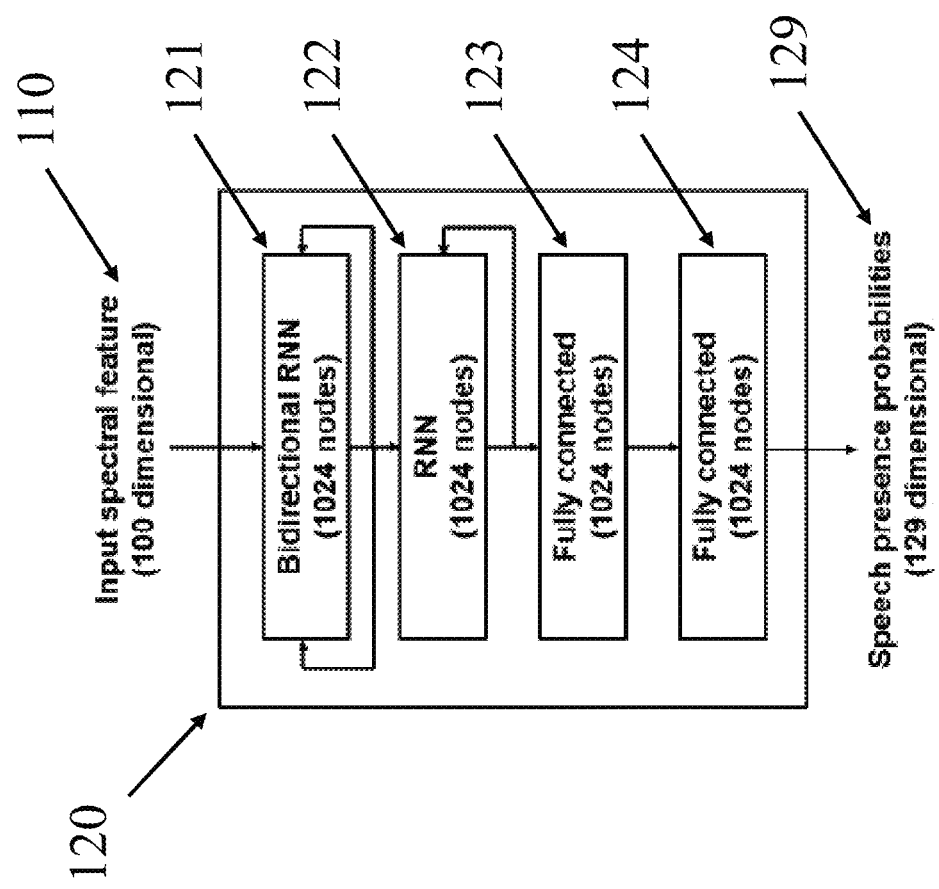
FIG. 2 is a block diagram representation of one exemplary embodiment of a deep neural network architecture for use in conjunction with speech enhancement systems, including those disclosed herein or otherwise derivable from the present disclosures.

FIG. 2 shows a non-limiting example of network architecture of a DNN 120, with the DNN 120 being trained and used to predict speech presence in an input spectrogram 110. The input can be a short-time spectral feature, and the output can be a mask of channel-specific posterior probabilities 129 indicating the presence of dominant speech in the frame. In the illustrated embodiment, the network includes a bidirectional recurrent neural network (RNN) input layer 121, followed by a standard RNN layer 122, and two fully-connected layers 123, 124, each with 1024 nodes, resulting in 6.6M trainable parameters. The network 120 can contain rectified linear unit (ReLU) activations in the hidden nodes, and sigmoid activations in the output layer. Other architectures can also be considered, including a completely feedforward network. Further, although in the illustrated embodiment each layer has the same number of nodes, in other instances, different numbers of nodes can be used in different layers, and the number of nodes can be a number other than 1024. The network 120 of FIG. 2 offers performance without introducing a prohibitive number of trainable parameters.

The features used for detection of speech presence can be based on log-spectra and modified for robustness, as shown in the following non-limiting input processing example. First, short-time log spectra can be extracted from the input signal 110, for instance using a 30 ms analysis window with 15 ms frame shift and Fast Fourier transform (FFT of length 256. Next, only channels corresponding to a passband (e.g., approximately 300 Hz to approximately 3400 Hz) can be retained. The band selection can be performed to both be compatible with telephony speech and to be robust to extreme far-field speech with a steep spectral drop-off.

Finally, cepstral mean subtraction can be performed on the first four cepstral coefficients with a window length of, for example, 1 second.

The present disclosure also provides for training the DNN 120, such as by using synthetic data. For example, a corpus of degraded speech based on clean speech from DARPA's TIMIT Acoustic-Phonetic Continuous Speech Corpus (TIMIT) (ISBN: 1-58563-019-5) Training and Test Data was designed using room impulse responses (RIRs) from the Voice-Home package, and additive noise and music from the MUSAN data set (available from http://www.openslr.org/17/). Training files were created in the following manner: first, conversations were simulated by concatenating eight randomly selected TIMIT files, with random amounts of silence between each, denoted as x (n). Additionally, randomized gains were applied to each input file to simulate the effect of talkers at different distances from the microphone. Next, an RIR was selected from the Voice-Home set and artificially windowed to match a target reverberation time, with the target $t_{60}$s uniformly sampled from the range [~0:~0 s; ~0:~5 s], giving the reverberant version of the signal z (n). Next, two additive noise files were selected from the MUSAN corpus, the first from the Free-Sound background noise subset (available at https://freesound.org), and the other either from the music corpus or the Free-Sound non-stationary noise subset. These files were combined with random gains, resulting in the noise signal v (n). The noise signal was then mixed with the reverberant speech signal to match a target SNR, with targets sampled uniformly from [~0 dB; ~20 dB], resulting in the degraded signal y (n). The duration of the training files averaged about 30 seconds, and the total corpus contained about 500 hours of data.

As previously discussed, the DNN 120 can be designed to predict speech presence in the input magnitude spectrogram 110, Y (k; m). Specifically, the network can be trained to label each time-frequency bin as belonging to one of two classes: $H_0$ (k, m), where speech is absent in Y, or $H_1$ (k, m), where speech is present in Y.

The output of the DNN 120 is the posterior probability of active speech, P ($H_1$|Y (k; m)), for each rime-frequency bin. During training, binary masks can be used as the output targets, and can be designed according to the following:

$$M(k, m) = \begin{cases} 1, & \text{if } \frac{X(k, m)}{Y(k, m)} > 0.5 \text{ and } \frac{Z(k, m)}{Y(k, m)} > 0.5 \\ 0, & \text{else} \end{cases} \quad \text{(Equation 1)}$$

where M (k; m) denotes the target mask for the $k^{th}$ channel of the $m^{th}$ frame, and X (k; m) and Z (k; m) denote the short-time magnitude spectra of the clean and reverberant signals, respectively. In this way, the output mask is only active if the energy due to clean speech and reverberant speech are both dominant with respect to the additive noise. This is motivated by the fact that the effect of reverberation in the short-time spectral domain cannot be approximated as non-negative as with additive noise, but can instead attenuate speech.

Improving Noise Estimation

The DNN 120 discussed in the previous section can be used in statistical model-based enhancement systems during the difficult task of noise tracking. If speech presence can reliably be detected in the input spectrogram, the underlying noise signal can accurately be tracked, even for non-stationary noise components. Embodiments can perform noise estimation recursively in time and enable the behavior of noise estimation to follow at least two constraints: (1) during inactive speech the estimate can simply track the initial spectrum, and (2) during active speech a smoothed version of the previous estimate can be used. These constraints can be combined in a soft-decision manner using the posterior probability of speech activity from the DNN 120, to give:

$$\hat{P}_v(k,m) = \alpha P(H_1|Y(k,m)) \cdot \hat{P}_v(k,m-1) + (1-\alpha P(H_1|Y(k,m))) Y^2(k,m) \quad \text{(Equation 2)}$$

Here, $\hat{P}_v(k, m)$ denotes the noise variance estimate in the short-time spectral domain, and $\alpha$ is a smoothing constant. The solution in Equation 2 does not assume the noise spectrum to be evolving slowly, and can track even highly non-stationary noise components. Additionally, in examples where the DNN 120 is trained with target masks defined as in Equation 1, the network learns to classify reverberation as inactive speech. In the case of speech with additive noise and reverberation, Equation 2 can then be used to track both the noise spectrum and reverberant tails.

Improving a priori SNR Estimation

Another difficult task during statistical-model based enhancement is the estimation of local signal-to-noise ratios (SNRs). Gain rules can be defined as a function of the a posteriori and a priori SNRs. The a posteriori SNR can be calculated as:

$$\gamma_{k,m} = \frac{Y^2(k,m)}{\hat{P}v(k,m)} \quad \text{(Equation 3)}$$

where the a priori SNR, $\xi_{k,m}$ provides for an estimate of the variance of the underlying clean signal, which can be challenging to estimate in the presence of noise. Embodiments of the present system can include the use of a simple calculation of $\xi_{k,m}$ based on the speech presence predictions from the neural network by using the following approximations:

$$E\{X^2(k,m)|Y(k,m)\} \approx P(H_1|Y(k,m))Y^2(k,m)$$

$$E\{V^2(k,m)|Y(k,m)\} \approx (1-P(H_1|Y(k,m)))Y^2(k,m) \quad \text{(Equation 4)}$$

which results in $$\xi_{k,m} = \frac{P(H_1|Y(k,m))}{1 - P(H_1|Y(k,m))} \quad \text{(Equation 5)}$$

Extending Convention Statistical Model-Based Enhancement Systems

Examples of the present disclosure for noise tracking and a priori SNR estimation can be integrated in a conventional model-based enhancement system. This provides added flexibility in system design, relative to end-to-end DNN-based systems (e.g., system using a DNN for speech reconstruction, in contrast to speech detection). For example, a variety of gain rules can improve speech enhancement performance by optimizing perceptually relevant cost functions. Other gain rules can be developed with heavy-tailed distributions to address the non-Gaussian behavior of speech and noise. Using the solutions in Equation 3 and Equation 5 allows for a choice of gain rules while still leveraging the powerful modeling capacity of DNNs. It is notable that for the trivial case of a Wiener filter, the gain reduces to:

$$G(k,m) = \frac{\xi_{k,m}}{1+\xi_{k,m}} = P(H_1|Y(k,m)) \quad \text{(Equation 6)}$$

However, in other instances, a more sophisticated gain rule can be utilized.

Another aspect of system design that becomes flexible within the proposed framework is the use of a soft-decision suppression filter. Traditional gain rules can be derived under the assumption that speech is active throughout the input spectrogram. However, an integrated two-state speech activity model with the gain rule can result in increased noise suppression during inactive speech. Using Equation 3 and Equation 5 allows a soft-decision suppression filter to be utilized, while still exploiting the power of deep neural networks.

Finally, the examples of the present framework allow more control over the tradeoff between noise suppression and speech quality. Truly end-to-end enhancement solutions do not provide a mechanism for tuning the system to be more conservative, and approaches that use DNNs to directly predict gains (e.g., using Equation 6), generally only provide a way to limit attenuation. In contrast, examples of the present disclosure allow for more elegant and effective ways to tune the system, such as using different gain rules or a soft-decision suppression filter.

Extraction of Signal Metadata

In addition to predicting speech presence, the DNN 120 can be simultaneously trained to extract various types of metadata, which can be considered a form of multi-task learning. Specifically, the network can be designed to predict frame-level voice activity decisions and SNRs as supplemental information. Further, it is possible the network can predict parameters relating to reverberation. These measures can then be used to improve overall enhancement performance. For example, frame level SNRs can be used to assess the reliability of the speech presence predictions and adjust suppression gains accordingly. Model-based systems typically include a gain floor to avoid perceptually annoying musical artifacts. For inputs with low predicted SNR, e.g., approximately <about 0 dB, the active speech posteriors can be assumed to be less reliable, and the enhancement system can adapt the gain floor to be more conservative.

The techniques and systems provided for herein are made clearer by way of spectrum processing examples, provided below.

Spectrum Processing

FIG. 3A-3D are graphs showing the conversation of an input audio recording to a spectrogram on a per-frame and per-frequency band basis. FIG. 3A shows a time-domain audio signal 101, indicated as y(n), and FIG. 3B shows a plurality of individual frames 102a-102c that can be extracted sequentially from the time-domain audio signal 101. FIG. 3C shows each frame 102a-102c processed with a Fourier transform to yield local spectra 103a-103c of each frame. FIG. 3D shows each frame 102a-102c (e.g., the short-time spectra) stacked together and the result is a spectrogram 110 comprising individual frames 109 (as shown, three, although any number of frames can be used) that can be input to, for example, the DNN 120.

FIGS. 4A-4D show different spectrograms of speech that can be processed using the systems and techniques described herein. FIG. 4A is a spectrogram 401 of a clean speech signal. This signal is incorporated into each of the spectrograms of FIGS. 4B-4D to represent the speech present. More specifically, the spectrograms in FIGS. 4B-4D represent spectrograms of the clean speech signal of FIG. 4A with an additional noise or distortion. For example, FIG. 4B shows a spectrogram 402 where the clean speech spectrogram 401 of FIG. 4A has been distorted with reverberation. Reverberation can be due, for instance, to multi-path propagation of sound and can be a function of room dimension, reflectivity of surfaces, or other parameters known to those skilled in the art. Reverb can have two perceptual effects—spectral shaping and an echoic effect—each of which causes the spectrogram 402 of FIG. 4B to be different from the spectrogram 401 of the clean speech signal in FIG. 4A. Examples of the present system include training a DNN 120 to detect the difference between speech and the reverberation effects of that speech, enabling subsequent processing to suppress the reverberation.

By way of further examples, FIG. 4C and FIG. 4D are spectrograms 403 and 404 where the clean speech spectrogram 401 of FIG. 4A has been distorted with the presence of noise. More specifically, the spectrogram 403 of FIG. 4C shows the clean speech spectrogram 401 in the presence of a stationary noise (e.g., a 15 dB car noise), and the spectrogram 410 of FIG. 4D shows the clean speech spectrogram 401 in the presence of stationary noise and a non-stationary noise (e.g., a 10 dB repeating car horn). The spectrogram 403 of FIG. 4C is used as the example initial spectrum 110 of the processing examples shown in FIGS. 5A-E, and the spectrogram 410 of FIG. 4D is used as the example initial spectrum 110 of the processing examples shown in FIGS. 6A-9B.

FIG. 5A shows the prior art model-based noise suppression system 10 of FIG. 1A. Here, the observed signal (e.g., the spectrogram 403) shown in FIG. 5B, is passed into the noise estimator 30 directly and the estimated noise 540 is shown in FIG. 5C. Note that the estimated noise 540 comprises entirely stationary noise, which is the known addition to the clean speech in the spectrogram 403. The gain estimator 50 receives the estimated noise 540 and generates a gain mask 550, shown in FIG. 5D, which is then used by the output processor 60 to modify the input spectrogram 403 to generate the enhanced spectrum 598 shown in FIG. 5E. Compared to the input spectrogram 403, the enhanced spectrum 598 appears to have reduced stationary noise.

FIG. 6A illustrates the prior art model-based noise suppression system 10 of FIG. 5A, but uses a different input spectrogram. As shown, the non-stationary noise spectrum 410 of FIG. 4D is the input. FIG. 6B shows the individual car horn pulses 670 in the spectrogram 410 that is passed to the noise estimator 30, and FIG. 6C shows the resultant estimated noise 640. Note the absence of any non-stationary noise components in FIG. 6C. Accordingly, the resultant gain mask 650 shown in FIG. 6D from the gain estimator 50 includes masking features 671 corresponding to the car horn pulses 670, which results in the enhanced signal 698 output shown in FIG. 6E containing no suppression of the non-stationary noise components 672.

Figure 7:
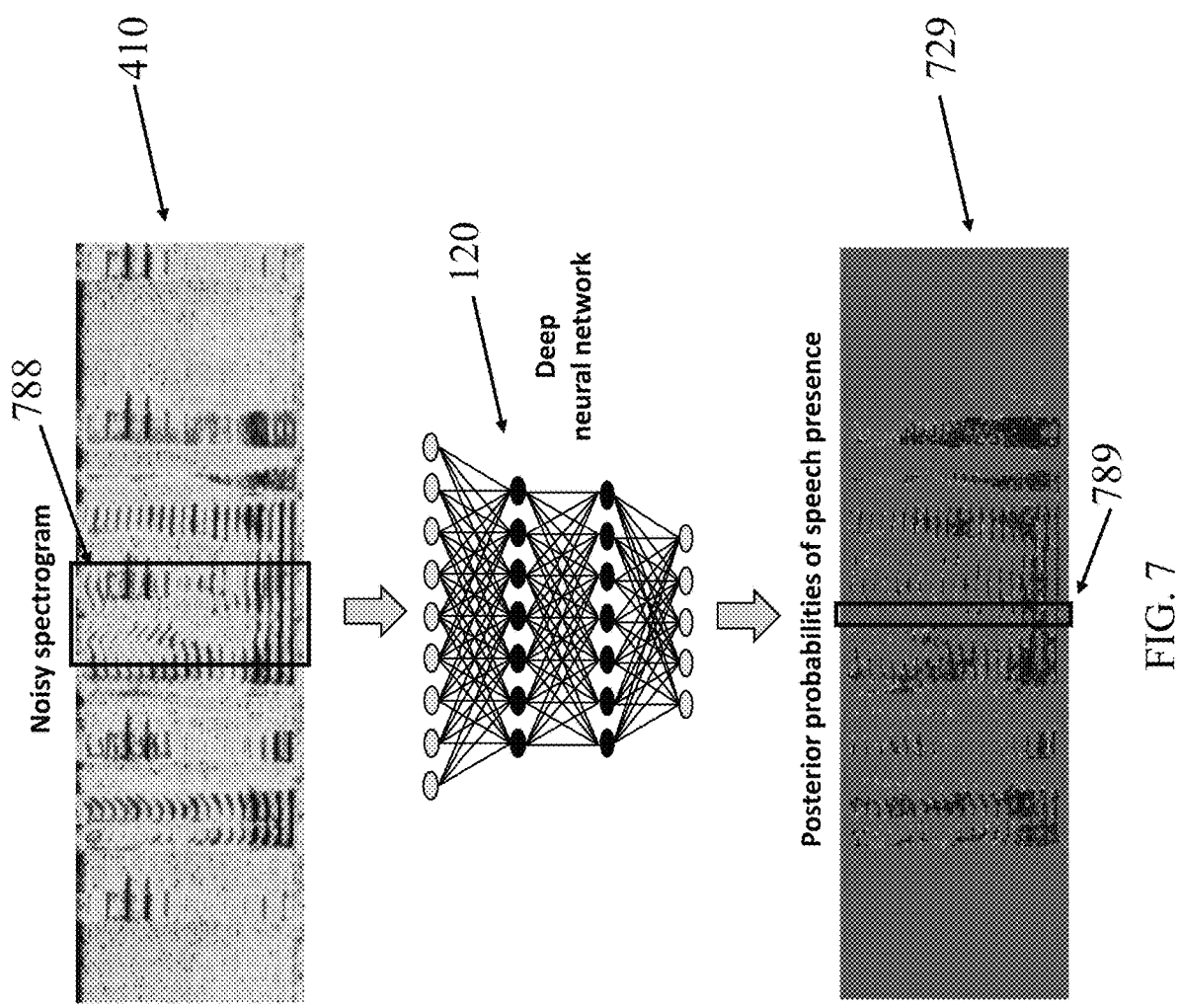
FIG. 7 is one exemplary illustration of a deep neural network processing a spectrogram with speech and non-stationary noise to classify the presence of speech in the spectrogram.

FIG. 7 is an illustration of training a deep neural network 120, and the processing it performs, using the non-stationary noise spectrum 410 as a sample input and a binary training mask 729 of posterior probabilities of speech present in a target, where each value of each frame of the training mask 729 represents a target probability of the presence of speech in a corresponding frequency band of the corresponding frame of the input noise spectrum 410. As shown, a segment 788 of frames of the spectrum 410 where both speech and a car horn pulse are present is identified, and the segment 789 of the output mask 789 where only the speech component is present is the desired output. Training the DNN 120 in this manner enables the DNN 120 to correctly identify and separated the non-stationary noise pulse from the speech.

Figure 9A:
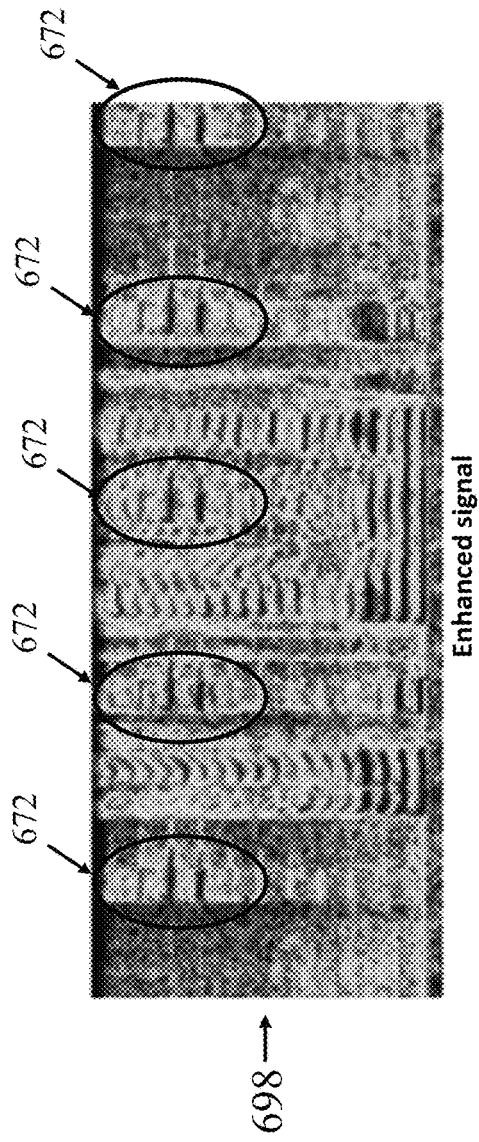
FIGS. 9A and 9B represent a comparison between the output illustrated in FIG. 6E and the output illustrated in FIG. 8F, when processing the same spectrogram with speech and non-stationary noise.
Figure 9B:
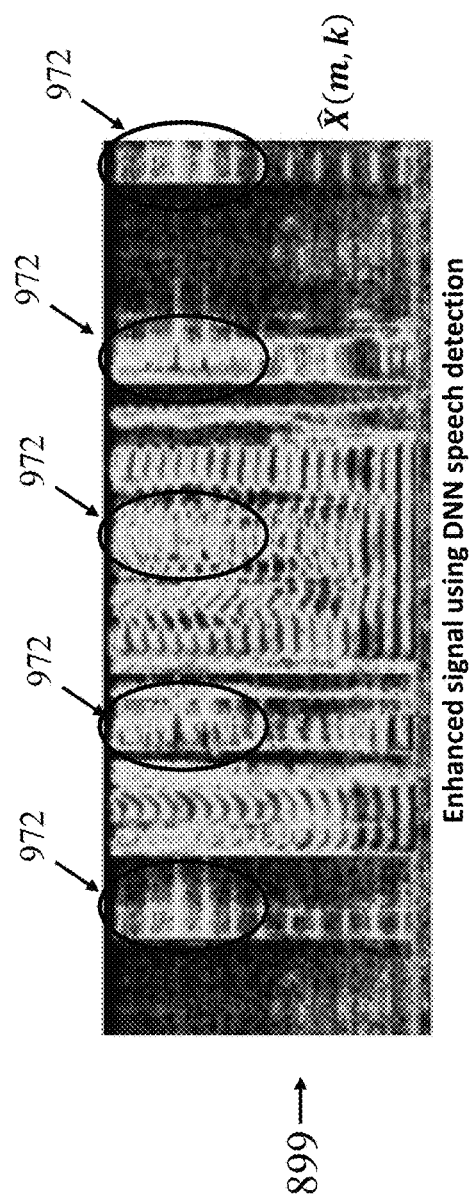

FIG. 8A shows the suppression system 100 of FIG. 1B with the spectrogram 410 as the input 110, the spectrogram 410 being provided in FIG. 8B. FIG. 8C shows the speech detection probabilities 830 output from the DNN 120. Note that little to none of the non-stationary noise components from the spectrogram 410 appear in the speech detection probabilities 830. The speech detection probabilities 830 are input to the noise estimator 120 along with the spectrogram 410 and FIG. 8D shows the resultant estimated noise 840. The resultant estimated noise 840 includes both stationary and non-stationary noise components. The gain estimator 150 then generates a gain mask 850, as shown in FIG. 8E, for use by the output processor 160 for generating the enhanced spectrogram 899 of FIG. 8F as an output. FIGS. 9A and 9B present a comparison between the output 698 of the prior art speech enhancement system of FIGS. 6A-6E and the output 899 of the example system of FIGS. 8A-8F processing the same spectrogram 410 with speech and non-stationary noise. FIG. 9A show a strong presence of the non-stationary noise components 672, and FIG. 9B shows a significantly attenuated presence of both the stationary noise and the non-stationary noise components 972.

While the spectrograms of FIGS. 3D, 4A-4D, 5B-5E, 6B-6E, 7, 8B-8F, 9A, and 9F are illustrated in grayscale, a person skilled in the art will recognize the grayscale spectrograms may actually, and often preferably, be color in practice, where the low amplitude regions are colored blue, and increasing amplitudes are shown as shifts from green to yellow and then to red, by way of non-limiting example.

Figure 10:
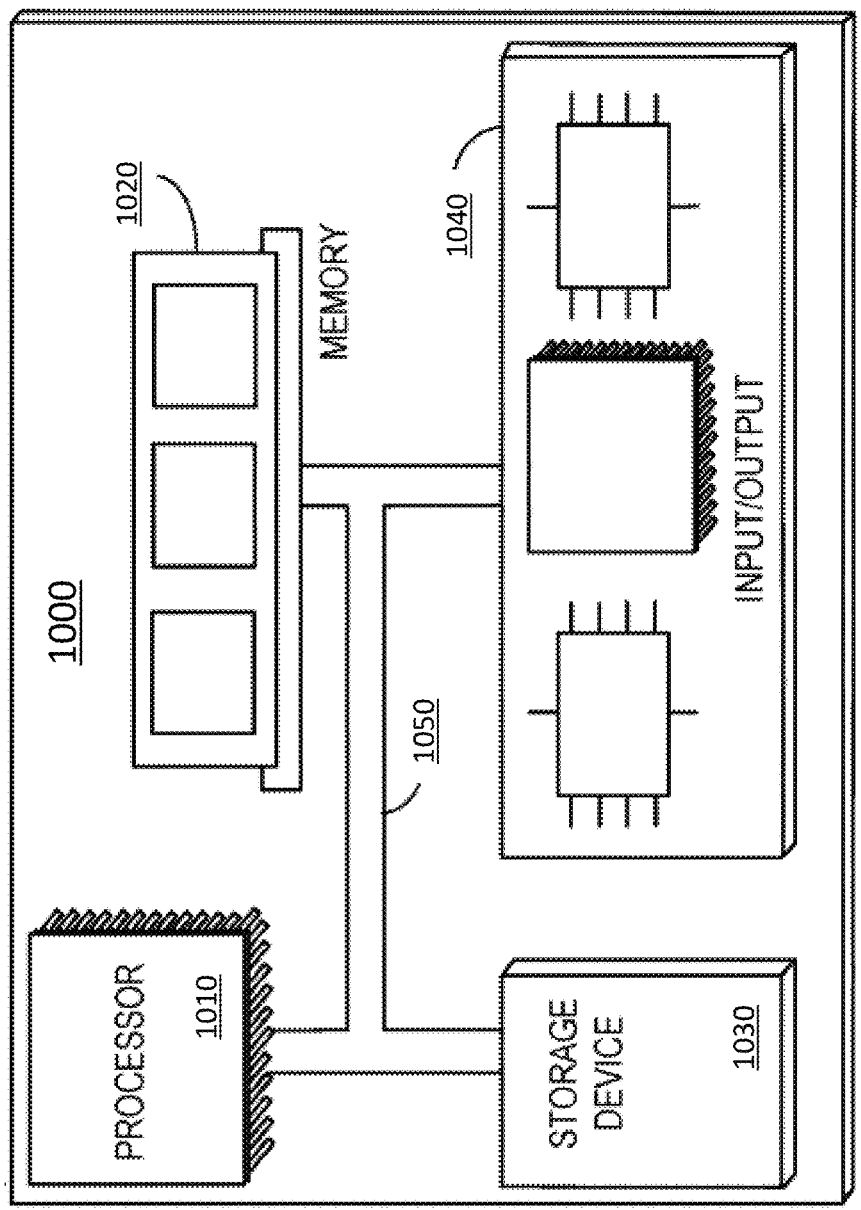
FIG. 10 is a block diagram of one exemplary embodiment of a computer system for use in conjunction with the present disclosures.

FIG. 10 provides for one non-limiting example of a computer system 1000 upon which the present disclosures can be built, performed, trained, etc. For example, referring to FIGS. 1B, 2, and 8A, the processing modules 90, 100, 120, 130, 140, 150, 160 can be examples of the system 1000 described herein. The system 1000 can include a processor 1010, a memory 1020, a storage device 1030, and an input/output device 1040. Each of the components 1010, 1020, 1030, and 1040 can be interconnected, for example, using a system bus 1050. The processor 1010 can be capable of processing instructions for execution within the system 1000. The processor 1010 can be a single-threaded processor, a multi-threaded processor, or similar device. The processor 1010 can be capable of processing instructions stored in the memory 1020 or on the storage device 1030. The processor 1010 may execute operations such as extracting spectral features from an initial spectrum, training a deep neural network, executing an existing deep neural network, estimating noise, estimating signal-to-noise ratios, calculating gain masks, or generating an output spectrum, among other features described in conjunction with the present disclosure.

The memory 1020 can store information within the system 1000. In some implementations, the memory 1020 can be a computer-readable medium. The memory 1020 can, for example, be a volatile memory unit or a non-volatile memory unit. In some implementations, the memory 1020 can store information related to various sounds, noises, environments, and spectrograms, among other information.

The storage device 1030 can be capable of providing mass storage for the system 1000. In some implementations, the storage device 1030 can be a non-transitory computer-readable medium. The storage device 1030 can include, for example, a hard disk device, an optical disk device, a solid-date drive, a flash drive, magnetic tape, or some other large capacity storage device. The storage device 1030 may alternatively be a cloud storage device, e.g., a logical storage device including multiple physical storage devices distributed on a network and accessed using a network. In some implementations, the information stored on the memory 1020 can also or instead be stored on the storage device 1030.

The input/output device 1040 can provide input/output operations for the system 1000. In some implementations, the input/output device 1040 can include one or more of network interface devices (e.g., an Ethernet card), a serial communication device (e.g., an RS-23210 port), and/or a wireless interface device (e.g., a short-range wireless communication device, an 802.11 card, a 3G wireless modem, or a 4G wireless modem). In some implementations, the input/output device 1040 can include driver devices configured to receive input data and send output data to other input/output devices, e.g., a keyboard, a printer, and display devices (such as the GUI 12). In some implementations, mobile computing devices, mobile communication devices, and other devices can be used.

In some implementations, the system 1000 can be a microcontroller. A microcontroller is a device that contains multiple elements of a computer system in a single electronics package. For example, the single electronics package could contain the processor 1010, the memory 1020, the storage device 1030, and input/output devices 1040.

Although an example processing system has been described above, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine-readable storage device, a machine-readable storage substrate, a memory device, a composition of matter effecting a machine readable propagated signal, or a combination of one or more of them.

Various embodiments of the present disclosure may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

The term "computer system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Such implementation may include a series of computer instructions fixed either on a tangible, non-transitory medium, such as a computer readable medium. The series of computer instructions can embody all or part of the functionality previously described herein with respect to the system. Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. The components of the system can be interconnected by any form or medium of digital data communication, e.g., a communication network. Examples of communication networks include a local area network ("LAN") and a wide area network ("WAN"), e.g., the Internet.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the present disclosure may be implemented as a combination of both software (e.g., a computer program product) and hardware. Still other embodiments of the present disclosure are implemented as entirely hardware, or entirely software.

The embodiments of the present disclosure described above are intended to be merely exemplary; numerous variations and modifications will be apparent to those skilled in the art. One skilled in the art will appreciate further features and advantages of the disclosure based on the above-described embodiments. Such variations and modifications are intended to be within the scope of the present invention as defined by any of the appended claims. Accordingly, the disclosure is not to be limited by what has been particularly shown and described, except as indicated by the appended claims. All publications and references cited herein are expressly incorporated herein by reference in their entirety.

What is claimed is:

1. A computer-implemented system for recognizing and processing speech, comprising:
an input processor configured to receive an input waveform and extract spectral features from the input waveform to form an initial spectrum;
a deep neural network trained to detect speech in the presence of both noise and reverberation, the deep neural network configured to receive the extracted spectral features and output speech detection probabilities indicating the presence of speech in the extracted spectral features; and
an output processor configured to modify the initial spectrum based on the speech detection probabilities indicating the presence of speech in each extracted spectral feature and output an enhanced waveform,
wherein the deep neural network was trained using speech conversations created by mixing a reverberant speech signal with a noise signal to match a target signal-to-noise ratio, wherein the noise signal was created with at least one of a background noise data, a music data, or a non-stationary noise data,
wherein the reverberant speech signal was created by applying a room impulse response to the speech data to match a target reverberation time, and
wherein binary masks were used as output targets during training of the deep neural network and each binary mask was only active if energy due to clean speech data and reverberant speech data were both dominant with respect to the noise signal.

2. The system of claim 1,
wherein the input processor is configured to extract spectral features from the input waveform in the time and frequency domain to form the initial spectrum;
wherein the deep neural network is configured to process the extracted spectral features to identify frame-specific and frequency band-specific speech presence in the initial spectrum; and
wherein the output processor is configured to modify the initial spectrum on a per-frame and per-frequency band basis.

3. The system of claim 1, wherein the deep neural network is configured to predict frame-specific and frequency-band specific speech activity for each extracted spectral feature.

4. The system of claim 1, wherein the speech data was created using a combination of clean speech data and silence data.

5. The system of claim 1, wherein the input is configured to extract short-time spectral features from a time-varying initial spectrum.

6. The system of claim 1, wherein the speech detection probabilities comprises a mask of frequency band-specific and frame-specific posterior probabilities.

7. The system of claim 1, comprising a filter configured to apply a passband to the input signal, the passband having a frequency range corresponding to speech.

8. The system of claim 7, wherein the filter is configured to apply cepstral mean subtraction on at least one cepstral coefficient of the input signal.

9. The system of claim 1, further comprising:
a noise estimator configured to receive the speech detection probabilities from the deep neural network and the input waveform and output a noise variance estimate on a per-frame and per-band basis, and wherein the output processor is configured to modify the input waveform based on the noise variance.

10. The system of claim 9, wherein the noise estimator is configured to perform noise estimation recursively in time.

11. The system of claim 9,
wherein the noise estimator is configured to process the initial spectrum as noise during inactive speech as determined by the output from the deep neural network and output the noise variance estimate of the inactive speech, and
wherein the noise estimator is configured to output an attenuated version of a previous noise estimate during active speech.

12. The system of claim 9, wherein the noise estimator is configured to combine the noise estimates for inactive speech and active speech together in a soft-decision manner using the probabilities of speech from the output of the deep neural network.

13. The system of claim 9, further comprising a signal-to-noise ratio estimator configured to:
receive the initial spectrum and the noise variance estimate; and
calculate an a posteriori signal-to-noise ratio (SNR) of the initial spectrum and the noise variance estimate.

14. The system of claim 13, wherein the signal-to-noise ratio estimator is further configured to:
receive the speech detection probabilities from the deep neural network; and
estimate an a priori signal-to-noise ratio (SNR) of an underlying clean speech signal of the initial spectrum based on the speech detection probabilities.

15. The system of claim 14, wherein one or both of the a posteriori SNRs and the a priori SNRs are calculated on a per-frame and per-frequency band basis.

16. The system of claim 9, further comprising a gain estimator configured to:
receive the initial spectrum and the noise variance estimate; and
calculate a gain mask for removing the estimated noise from the initial spectrum, wherein the output processor is configured to modify the initial spectrum based on the gain mask.

17. The system of claim 9, wherein the noise estimator is configured to calculate SNRs on a per-frame and per-frequency band basis, the system further comprising a gain estimator configured to:
receive the initial spectrum, the noise variance estimate, and the SNRs; and
calculate a gain mask for each frame-specific and band-specific component in the initial spectrum based on a respective SNR such that a strength of each gain mask corresponds to the value of the corresponding SNR,
wherein the output processor is configured to modify the initial spectrum based on the gain masks.

18. A method for training a neural network for detecting the presence of speech comprising:
constructing a multi-layer deep neural network configured to process extracted spectral features from an initial spectrum on a per-frame and per-frequency band basis to identify frame-specific and frequency band-specific spectral features that correspond to speech;
training the deep neural network using speech conversations created using speech data containing noise and reverberation; and
training the deep neural network using binary masks as output targets, wherein the speech conversations were created by mixing a reverberant speech signal with a noise signal to match a target signal-to-noise ratio, wherein the noise signal was created with at least one of a background noise data, a music data, or a non-stationary noise data, wherein the reverberant speech signal was created by applying a room impulse response to the speech data to match a target reverberation time, wherein the speech data was created using a combination of clean speech data and silence data with a gain to simulate a recording distance, and wherein the output mask was only active if energy due to clean speech data and reverberant speech data were both dominant with respect to the noise signal.

* * * * *